(12) United States Patent
Suzuki et al.

(10) Patent No.: US 7,168,940 B2
(45) Date of Patent: Jan. 30, 2007

(54) METHOD AND APPARATUS FOR TREATING A DISC SUBSTRATE

(75) Inventors: Takayuki Suzuki, Chiba (JP); Masahiro Nakamura, Saitama (JP); Hideo Kobayashi, Tokyo (JP); Shinichi Shinohara, Tokyo (JP)

(73) Assignee: Origin Electric Company, Limited, Tokyo (JP)

( * ) Notice: Subject to any disclaimer, the term of this patent is extended or adjusted under 35 U.S.C. 154(b) by 0 days.

(21) Appl. No.: 11/048,384

(22) Filed: Jan. 31, 2005

(65) Prior Publication Data

US 2005/0129804 A1    Jun. 16, 2005

Related U.S. Application Data

(62) Division of application No. 10/309,464, filed on Dec. 3, 2002.

(30) Foreign Application Priority Data

Dec. 5, 2001    (JP) .................. P 2001-371810

(51) Int. Cl.
    *B29D 11/00*    (2006.01)
(52) U.S. Cl. ................ 425/402; 425/404; 425/445; 425/810
(58) Field of Classification Search ........... 425/383, 425/402, 404, 455, 810; 264/1.33, 2.6, 2.7, 264/237, 348
    See application file for complete search history.

(56) References Cited

U.S. PATENT DOCUMENTS

| 5,006,058 A | 4/1991 | Maruyama et al. |
| 5,686,026 A | 11/1997 | Ebina |
| 5,858,414 A | 1/1999 | Hayashi et al. |
| 2001/0018093 A1 | 8/2001 | Decre |

FOREIGN PATENT DOCUMENTS

| DE | 3839536 | 6/1989 |
| JP | 58151222 | 9/1983 |
| JP | 60-132322 | 9/1985 |
| JP | 62165731 | 7/1987 |
| JP | 5-109126 | 4/1993 |
| JP | 9-97455 | 4/1997 |
| JP | 9-97456 | 4/1997 |
| JP | 9-138978 | 5/1997 |
| JP | 11-345435 | 12/1999 |

OTHER PUBLICATIONS

Computer translsation of JP 05-109126.*

* cited by examiner

*Primary Examiner*—Donald Heckenberg
(74) *Attorney, Agent, or Firm*—Kolisch Hartwell, P.C.

(57) ABSTRACT

A molded disc substrate obtained by injection molding is rotated at high speed before the molded disc substrate has solidified, and a gas is also made to flow in an outward radial direction along a bottom surface of the molded disc substrate while the molded disc substrate is rotating, and the rotation is stopped after the molded disc substrate has solidified. Thus, a disc substrate with little warping is obtained in a short time.

4 Claims, 8 Drawing Sheets

METHOD AND APPARATUS FOR TREATING A DISC SUBSTRATE

CROSS-REFERENCE TO RELATED APPLICATION

The present application is a division of U.S. patent application Ser. No. 10/309,464, filed Dec. 3, 2002, which is incorporated herein by reference in its entirety for all purposes.

BACKGROUND OF THE INVENTION

1. Field of the Invention

The present invention relates to a method and apparatus that reduce warping of an optical disc such as a DVD or compact disc and, particularly, to a method and apparatus that effectively cool while simultaneously reducing warping in an injection molded disc substrate.

2. Description of the Related Art

Figure 8A:
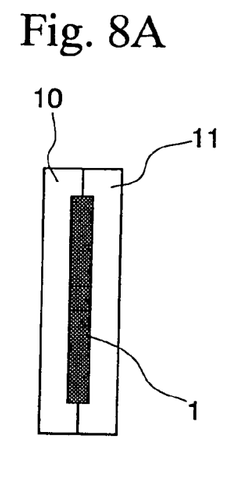
FIGS. 8A to 8C are views for describing conventional molded disc substrate warping.
Figure 8B:
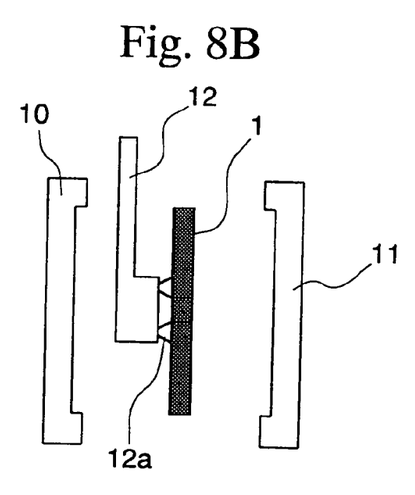

Generally, an optical disc substrate such as a DVD substrate or a compact disc substrate is molded by injection molding. As is shown in FIG. 8A, when molding a disc substrate, a resin material that is to become a disc substrate is injected into a pair of molds 10 and 11 so as to form a molded disc substrate 1. At this time, predetermined information is recorded on one surface of the molded disc substrate 1. Next, as is shown in FIG. 8B, the molds 10 and 11 are opened on both sides, and a takeout arm 12 of a takeout mechanism (not shown) moves forward between the molds 10 and 11, and holds the molded disc substrate 1, which is still soft and at a high temperature, by suction. The takeout arm 12 then moves backwards and removes the molded disc substrate 1 from the molds 10 and 11.

Figure 8C:
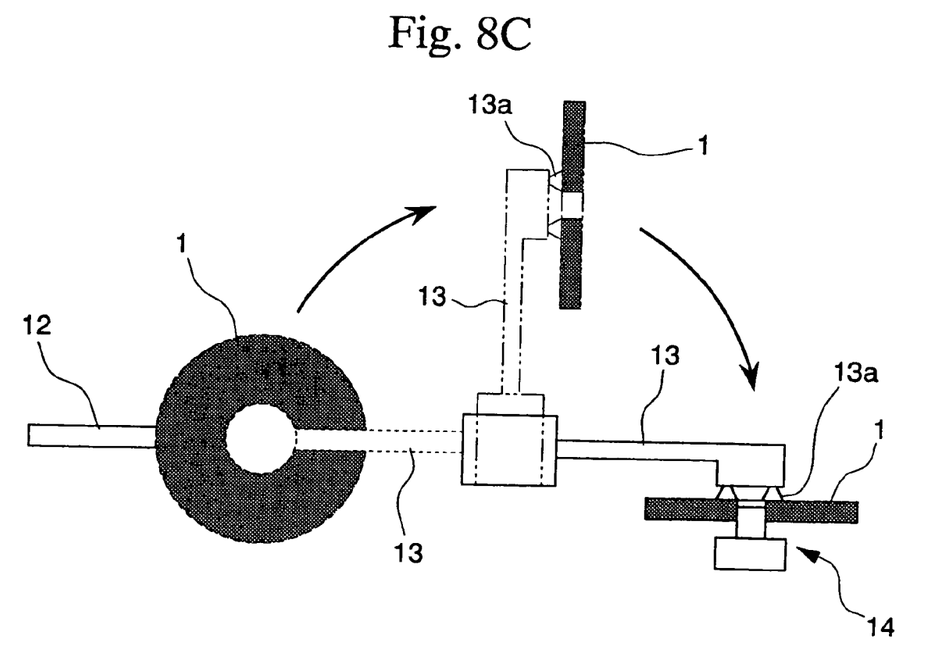

Next, as is shown in FIG. 8C, the disc substrate 1 that has been taken out of the molds 10 and 11 is held directly by suction by a transporting arm 13 of a transporting mechanism in a particular position, and is then transported by the transporting arm to a cooling stage 14. More specifically, the molded disc substrate 1 that has been removed from the molds 10 and 11 and is held by suction by an suction portion 12a of the distal end of the takeout arm 12, has a first surface and a second surface on the opposite side to the first surface that is held by the suction of the takeout arm 12. This second surface is held by suction by a holding portion 13a provided at the distal end of a transporting arm 13. Practically simultaneously with this, the suction portion 12a of the takeout arm 12 releases its hold of the molded disc substrate 1. Thereafter, while holding it the transporting arm 13 turns the molded disc substrate 1 by substantially 180 degrees, and then transfers the molded disc substrate 1 to the cooling stage 14. The molded disc substrate 1 is then cooled by the cooling stage 14, and the resin material thereof is solidified so as to form a disc substrate 1; The temperature at which this solidifying may take place is, for example, approximately 90° C.

As described above, immediately after being taken out from the molds of the molding machine the molded disc substrate 1 has a high temperature and is fairly soft. Therefore, in the process in which it is cooled and the resin material thereof is solidified so as to form the disc substrate 1, it can be understood that the molded disc substrate undergoes considerable deformation, namely, warping. Conventionally, in order to reduce this warping, various conditions are adjusted during the injection molding, for example, the warping may be reduced by adjusting the temperature of the molds, or by setting different temperatures for the mold 10 and the mold 11, alternatively, the pressure may be adjusted when the resin material is being injected.

However, even if a molded disc substrate 1 with a small amount of warping is obtained through the methods described above, because immediately after being taken out from the molds of the molding machine the molded disc substrate 1 has a high temperature and is in a sufficiently soft state, the problem arises that the molded disc substrate 1 becomes warped when it is taken out from the molds, and also during the process of being moved by the transporting mechanism to the cooling stage. Moreover, there is a large amount of warping even during the cooling process. This point is described below using FIGS. 9A to 9C.

Figure 9A:
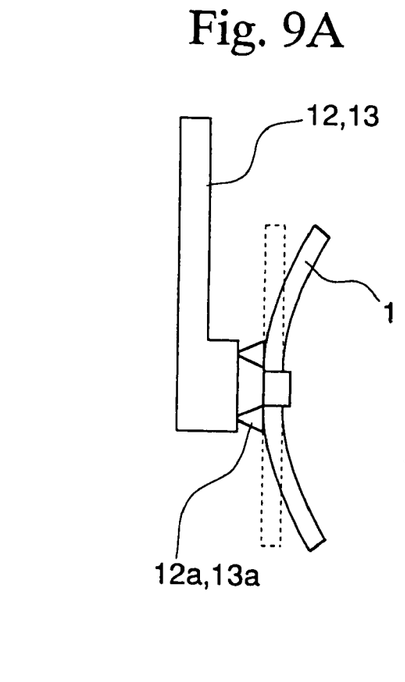
FIGS. 9A to 9C are views for describing conventional molded disc substrate warping.

FIG. 9A shows the suction portion 12a of the takeout arm 12 holding the molded disc substrate 1 in order to remove the disc substrate 1 from the molds of the molding machine, or alternatively shows the suction holding portion 13a of the transporting arm 13 holding the molded disc substrate 1 by suction. Because the molded disc substrate 1 has a high temperature and is in a sufficiently soft state, it has been confirmed that when an arm adheres to the center portion of the molded disc substrate 1 then that molded disc substrate 1 is bent by the force of the suction in the opposite direction from the side of the suction. In particular, because the thickness of a DVD is approximately a thin 0.6 mm as compared with the 1.2 mm thickness of a compact disc, the bending in a DVD is far more marked.

Figure 9B:
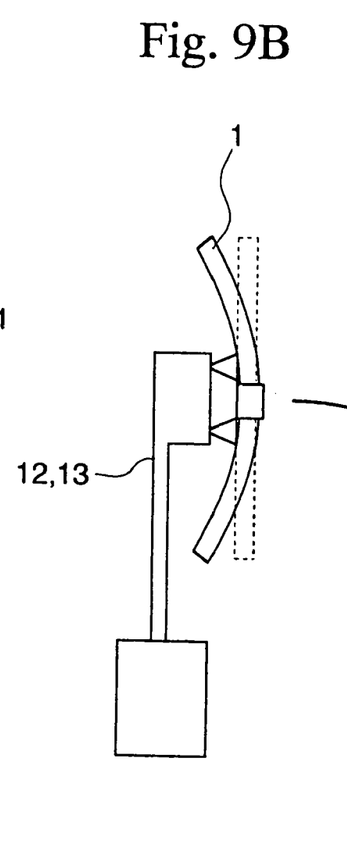

Moreover, as is shown in FIG. 9B, it has also been confirmed that if the takeout arm 12 or the transporting arm 13 turns or moves at a comparatively fast speed while holding by suction a molded disc substrate 1, then the molded disc substrate 1 is warped by the wind pressure of that action.

Figure 9C:
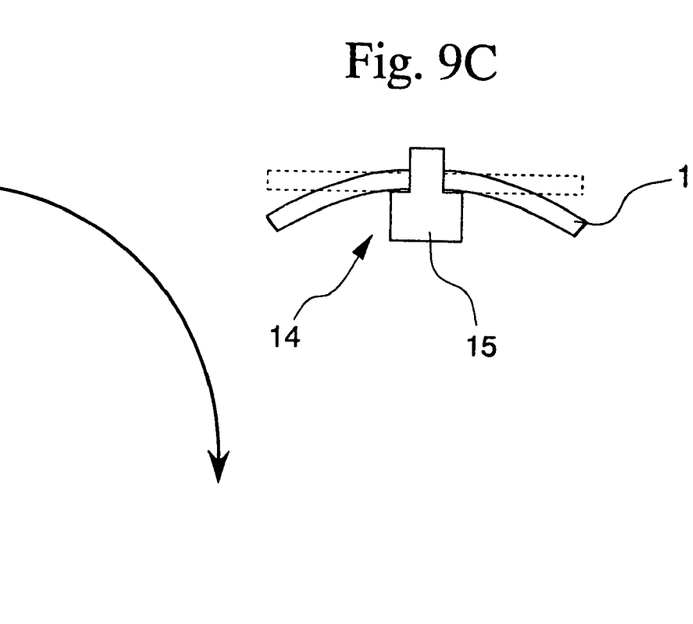

Furthermore, as is shown in FIG. 9C, it has further been confirmed that there are cases when a molded disc substrate 1 is warped by its own weight during the period it is being transferred to a disc receiving base of the cooling stage 14 and is cooling. In addition, there are also cases in which the molded disc substrate 1 is partially deformed by the structure of the cooling stage when the molded disc substrate 1 is cooling on the cooling stage.

The above warping is generated not only in the radial direction of the molded disc substrate 1 (that is, the substrate 1 warps in a saddle shape), but also in the tangential direction of the disc substrate 1 (that is, the substrate 1 is warped in a wavy pattern at the periphery thereof). This warping appears more marked as the disc substrate production cycle time is shortened, so that the problem thereby arises of the warping in the disc substrate increasing.

In order to solve the above described conventional problems, by applying centrifugal force by rotating a molded disc substrate at high speed while the molded disc substrate was still soft before the resin material thereof had solidified, so as to reduce warping and deformation in the disc substrate while simultaneously cooling the disc substrate, the present inventors were able to obtain a disc substrate with only a small amount of warping and deformation, as is described in Japanese Patent Application No. 2001-197738 filed on Jun. 29, 2001.

It is an object of the present invention to solve the problem of how to further reduce warping in the molded disc substrate 1 by supplying cooling gas to the molded disc substrate 1 while the molded disc substrate 1 is placed on a disc receiving base 2 and is being rotated at high speed so as to cool the molded disc substrate 1 to room temperature in a short time and thereby achieve a shortening in the production time. At the same time, it is an object of the present invention, either while the rotation speed is being accelerated or once the molded disc substrate 1 is rotating at full speed, to prevent flapping, which occurs when the cooling gas is being blown onto the molded disc substrate 1 as it rotates, in order to reduce the warping of the disc substrate.

SUMMARY OF THE INVENTION

In order to solve the above problems, the first aspect of the present invention is a disc substrate processing method in which a molded disc substrate obtained by injection molding is rotated at high speed before the molded disc substrate has solidified, and a gas is also made to flow along at least one surface of the molded disc substrate while the molded disc substrate is rotating, and the rotation is stopped after the molded disc substrate has solidified.

According to this aspect, at the same time as a shortening in the cooling time of the molded disc substrate is achieved, it is possible to prevent the molded disc substrate which is rotating while still in a soft condition from flapping (fluttering) as it rotates, thereby enabling a further reduction in the warping of the molded disc substrate to be achieved.

In the second aspect of the present invention, the gas is discharged so as to flow in an outward radial direction along a bottom surface of the molded disc substrate.

The third aspect of the present invention is the disc substrate processing method according to the first or second aspect, wherein the gas is left flowing until the temperature of the molded disc substrate is lowered to room temperature.

According to the third aspect, because the gas is left flowing over the molded disc substrate after it has solidified, the molded disc substrate can be lowered to room temperature in a short time.

The fourth aspect of the present invention is the disc substrate processing method according to one of the preceding aspects, wherein the wind velocity and/or temperature of the gas is adjusted by a controller.

According to the fourth aspect, by adjusting the wind velocity or temperature of the gas it is possible to adjust the time taken before the molded disc substrate solidifies, and to thereby obtain a disc substrate with even less warping.

The fifth aspect of the present invention is the disc substrate processing method according to one of the preceding aspects, wherein the molded disc substrate is accelerated to a rotation speed of 3,000 rpm or more, and preferably 4,000 rpm or more within approximately two seconds (for example, 1.5 to 3 seconds).

It is possible to impart centrifugal force that is capable of effectively reducing warping in a molded disc substrate, enabling an optical disc with even less warping to be obtained.

The sixth aspect of the present invention is a disc substrate processing method in which warping of a molded disc substrate obtained by injection molding is reduced by rotating the molded disc substrate at high speed before the molded disc substrate has solidified, and after the molded disc substrate has solidified it is cooled by blowing gas onto one surface or both surfaces of the molded disc substrate.

Because the cooling gas is blown onto the molded disc substrate after the molded disc substrate has solidified, regardless of the manner in which the gas is blown onto the molded disc substrate, there is no effect on the reduction of the warping of the molded disc substrate.

The seventh aspect of the present invention is the disc substrate processing method according to the sixth aspect, wherein, when the temperature of the molded disc substrate has dropped to the solidification temperature of the resin material used to form the molded disc substrate, the molded disc substrate is cooled by blowing gas onto the molded disc substrate.

The eighth aspect of the present invention is the disc substrate processing method according to the seventh aspect, wherein the temperature of the molded disc substrate is the solidification temperature of the resin material used to form the molded disc substrate, which is substantially 90° C.

The ninth aspect of the present invention is the disc substrate processing method according to the sixth aspect, wherein the gas is blown onto the molded disc substrate after a molded disc solidification time has passed since the start of rotation of the molded disc substrate.

The tenth aspect of the present invention is the disc substrate processing method according to the ninth aspect, wherein the solidification time is approximately two seconds (for example, 1.5 to 3 seconds).

The eleventh aspect of the present invention is a disc substrate processing apparatus that reduces warping in a molded disc substrate obtained by injection molding by rotating the molded disc substrate at high speed, comprising: a disc receiving base for receiving the molded disc substrate having a flange extending from a top portion in an outer radial direction; a rotating column to which the disc receiving base is joined; and a rotation drive device that is joined to the disc receiving base via the rotating column and rotates the molded disc substrate by rotating the disc receiving base, wherein by discharging gas from the gas discharging device while the disc receiving base is rotating, a gas is made to flow in an outward radial direction along a bottom surface of the rotating molded disc substrate, so as to reduce warping of the molded disc substrate and shorten cooling time.

According to this processing apparatus, by imparting pulling force based on centrifugal force by rotating the still soft molded disc substrate at high speed such that it does not flap so as to thereby reduce warping, it is possible to cool a molded disc substrate at the same time as obtaining a stable molded disc substrate with reduced warping and no irregularities.

The twelfth aspect of the present invention is the disc substrate processing apparatus according to the eleventh aspect, wherein the gas discharge device is a gas discharge nozzle that is positioned on a receding side relative to a center axis line of the rotation column so as to supply gas from a diagonally lower position to the receding side of the rotation column.

According to this processing apparatus, because the gas discharge device can be fixed and is not rotated, the apparatus can be provided at low cost.

The thirteenth aspect of the present invention is the disc substrate processing apparatus according to the eleventh aspect, wherein the gas discharge device is one or more discharge holes provided below the flange of the disc receiving base.

The fourteenth aspect of the present invention is the disc substrate processing apparatus according to any of the eleventh through thirteenth aspects, wherein there is provided a temperature control device to lower or raise the temperature of the gas. The temperature control device may be a cooler or a heater.

The fifteenth aspect of the present invention is a disc substrate processing apparatus that reduces warping in a molded disc substrate obtained by injection molding by rotating the molded disc substrate at high speed, comprising: a disc receiving base for receiving the molded disc substrate; a rotating column to which the disc receiving base is joined;

and a rotation drive device that is joined to the disc receiving base via the rotating column and rotates the molded disc substrate by rotating the disc receiving base, wherein gas blowing device that blows gas onto one surface or both surfaces of the molded disc substrate after the molded disc substrate has solidified is provided on one side or both sides of the molded disc substrate.

Because it is possible to employ a blowing device having a simple structure, this is advantageous cost wise.

The sixteenth aspect of the present invention is the disc substrate processing apparatus according to the fifteenth aspect in which the gas blowing device discharges gas when the molded disc substrate has solidified.

DESCRIPTION OF THE PREFERRED EMBODIMENTS

Because immediately after being taken out from the molds of the molding machine, a molded disc substrate has a high temperature and is in a sufficiently soft state, particularly when the production cycle time is shortened, warping of the molded disc substrate in the tangential direction increases due to wind pressure during transportation, stress caused by the suction holding, stress arising during molding, or due to the weight of the molded disc substrate. Accordingly, in the basic operation of the present invention, while a molded disc substrate is in a high temperature state, namely before the resin material thereof has solidified, the molded disc substrate is placed on the disc receiving base 2 and rotated at high speed. As a result, centrifugal force acts thereon, and the warping of the molded disc substrate is reduced by the resulting pulling force in an outward radial direction. The high speed rotation described here is 3,000 rpm or more, and preferably 4,000 rpm or more.

Figure 1A:
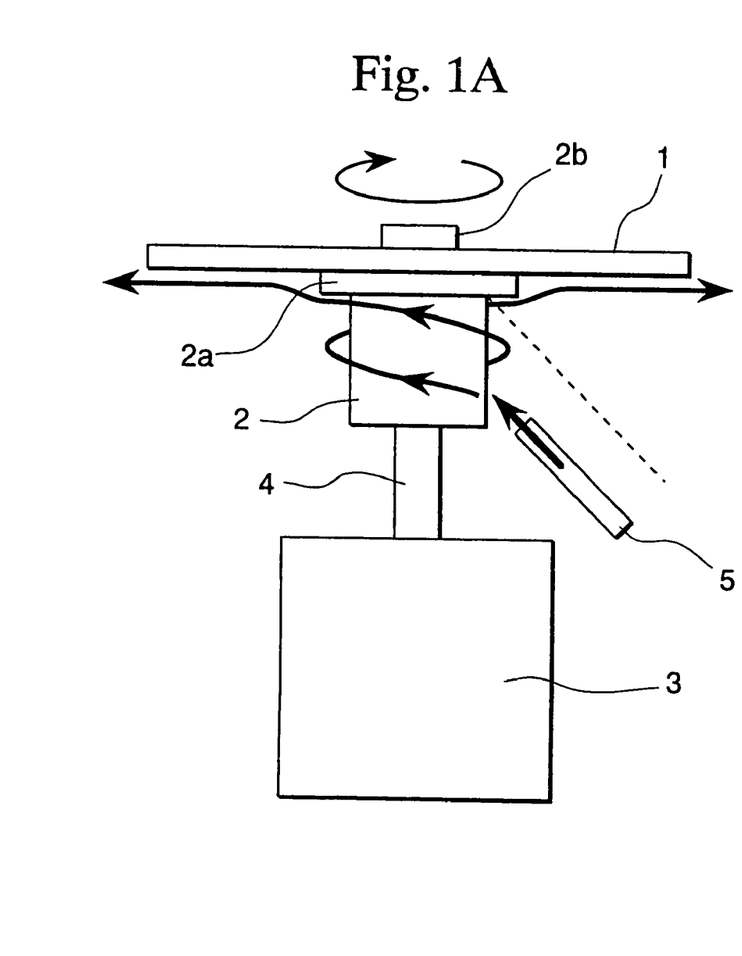
FIGS. 1A and 1B are respectively a front view and a side view of an embodiment of the present invention.
Figure 1B:
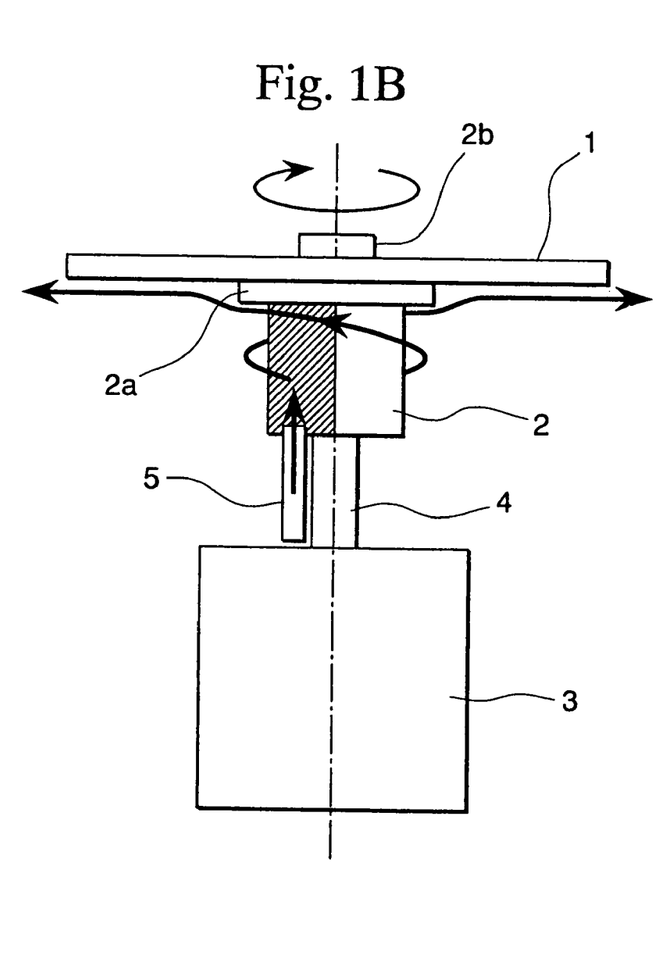

However, if simply a molded disc substrate is placed on the disc receiving base 2 and a gas is blown onto the molded disc substrate while it is rotating at high speed, then although the cooling is speed up the molded disc substrate rotates while flapping. As a result, warping of the molded disc substrate is instead increased. Accordingly, as is shown in FIGS. 1A and 1B in the present invention, when the molded disc substrate 1 has been place on the disc receiving base 2, by supplying gas from an inner radial direction to an outer radial direction along the lower surface of the molded disc substrate 1 while rotating it at high speed, it is possible to achieve an even greater reduction in the warping of the molded disc substrate 1 by rapidly raising the number of rotations from zero to a predetermined number without flapping of the molded disc substrate 1, while at the same time hastening the cooling of the molded disc substrate 1 and achieving a shortening in the production time. In addition, it is also possible to prevent any flapping of the molded disk substrate 1 that is generated when the cooling gas is blown thereon while the molded disk substrate 1 is being rotated.

An embodiment of the present invention will now be described using FIGS. 1A, 1B, and 2. A molded disc substrate 1 that is still in a reasonably soft state and is at high temperature is held by suction by a normal transporting device (not shown) and transferred onto the disc receiving base 2. The disc receiving base 2 is provided on the top side thereof with a comparatively thin flange 2a, and has suction device (not shown) for suctioning to a plurality of locations in the vicinity of the inner periphery of the molded disc substrate 1. The disc receiving base 2 is joined to a rotation shaft 4 that is rotated by a rotation drive device 3, or is formed integrally with the rotation shaft 4. The flange 2a has a radius of one-third or less the diameter of the molded disc substrate 1, and preferably a radius of a size whereby it does not impinge on the recording area of the molded disc substrate 1. In the center of rotation of the disc receiving base 2, there is provided a central protrusion 2b that is inserted into a center hole (not shown) in the molded disc substrate 1. Note that, although this is not shown, the suction portion of the disc receiving base 2 is joined to an external vacuum pump mechanism (not shown) through the rotation shaft 4. The rotation drive device 3 is able to accelerate in a short time to a predetermined high speed of rotation, for example, 10,000 rpm.

In the present embodiment, a gas discharge nozzle 5 is provided for causing a fairly strong air flow to flow from an inner radial direction in an outer radial direction along the lower surface of the molded disc substrate 1 while this disc is rotating, by causing a spiral flow and a diagonally upward moving air flow to collide at the lower surface of the flange 2a. It is desirable that this airflow has a sufficient speed to overcome the rotational airflow in the extreme close vicinity of the molded disc substrate 1 that is generated by the high speed rotation of the molded disc substrate 1. For example, when the molded disc substrate 1 is rotating at 3,000 rpm, the circumferential speed of the molded disc substrate 1 in the vicinity of the flange 2a is approximately 10 m/s, while the circumferential speed of the outer peripheral portion of the molded disc substrate 1 is approximately 19 m/s. Therefore, the speed of the airflow is approximately 10 m/s or more, and preferably approximately 19 m/s or more. When the molded disc substrate 1 is rotating at 4,000 rpm and 5,000 rpm respectively, then because the circumferential speeds at the outer peripheral portion of the molded disc substrate 1 are approximately 25 m/s and approximately 31 m/s respectively, the speeds of the airflow are preferably 25 m/s or more and approximately 31 m/s or more respectively. Accordingly, when the maximum speed of rotation of the molded disc substrate 1 is set to 5,000 rpm, by setting the speed of the airflow to approximately 31 m/s or more, there is no need to adjust the speed of the airflow in accordance with the speed of rotation.

Figure 2:
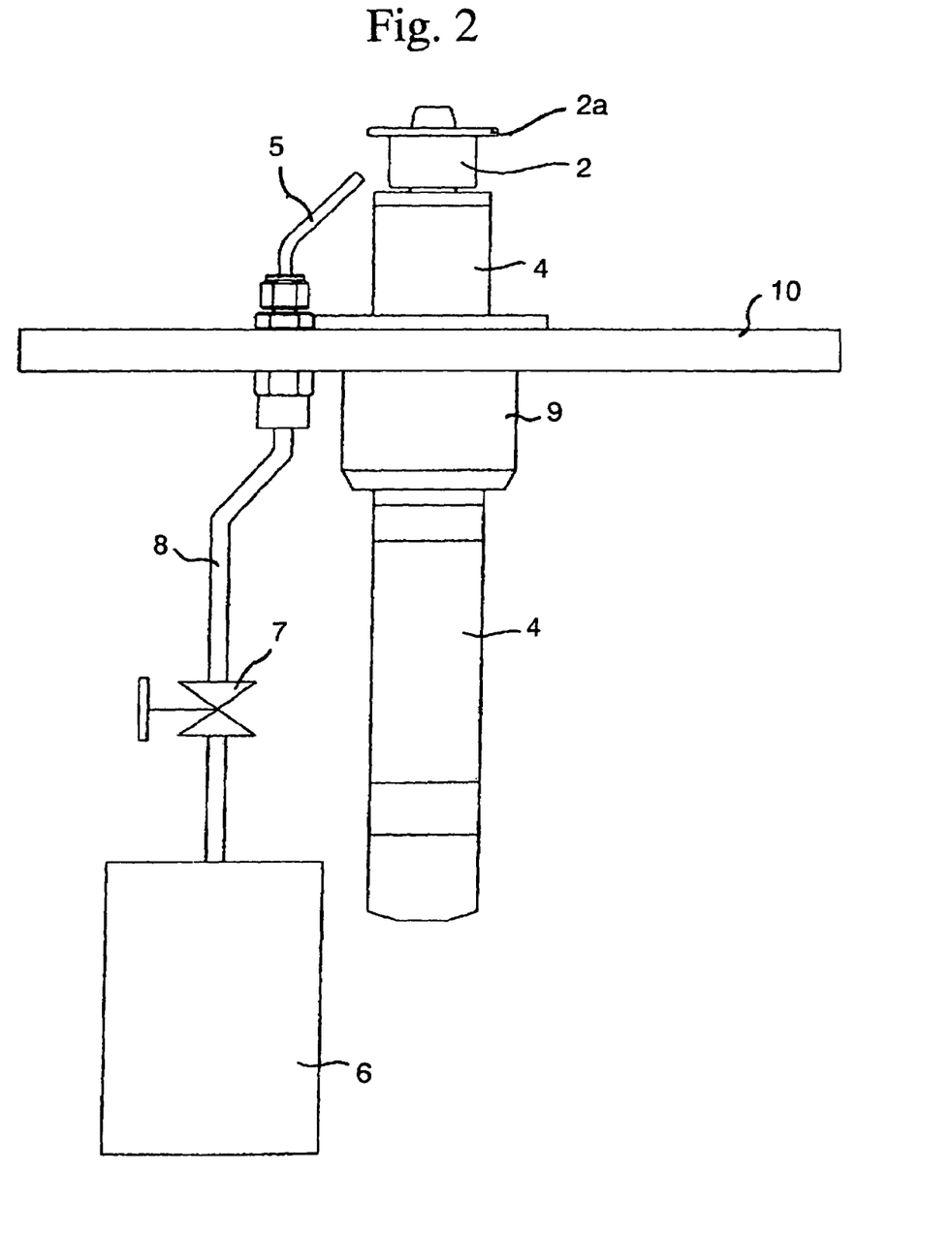
FIG. 2 is a view for describing an embodiment of the present invention.

The gas discharge nozzle 5 disconnected via a regulating valve 7 shown in FIG. 2 and a gas supply pipe 8 to a compressed air supply device 6 such as a compressor that supplies compressed air. There may be one or a plurality of gas discharge nozzles 5, and the gas discharge nozzle 5 is preferably placed such that the lower surface of the flange 2a is on a line extending from the line of the central axis of the gas discharge nozzle 5. What is more important is that the gas discharge nozzle 5 discharges gas in the same direction as the rotation direction of the disc receiving base 2 or the rotation shaft 4. Namely, as shown in FIG. 1B, the gas discharge nozzle 5 should be arranged toward the receding side (the left hatched area in FIG. 11B) of the rotating disc receiving base 2 so that the direction of gas flow coincides with the rotational direction of the flange 2a and the disc receiving base 2. The gas flow cannot be applied toward the approaching side (the right side in FIG. 1B) of the rotating disc receiving base 2.

As shown in FIG. 2, the rotation shaft 4 is rotatably fixed to a base 10 via a supporting member 9. In addition, the gas discharge nozzle 5 is also fixed to the base 10.

In this way, by discharging a gas on the receding side of the disc receiving base 2 or the rotation shaft 4 such that the discharged gas does not directly strike the molded disc substrate 1, a portion of the gas flow is formed into a vortex flow by the rotation of the disc receiving base 2 or the rotation shaft 4 and strikes the lower surface of the flange 2a. The remaining airflow, which is moving substantially straight ahead, strikes the lower surface of the flange 2a substantially from a diagonally downward direction. The airflow that strikes the lower surface of the flange 2a flows along the lower surface of the molded disc substrate 1 from an inner radial direction in an outward radial direction. The vortex flow of this gas flows substantially uniformly in an outward radial direction along the lower surface of the molded disc substrate 1 from the lower surface of the flange 2a, however, the remainder of the substantially forward moving airflow collides with specific portions of the lower surface of the flange 2a, and flows in an outward radial direction along specific portions of the lower surface of the molded disc substrate 1 and portions adjacent thereto. These airflow accelerates the cooling of the molded disc substrate 1 and, at the same time, prevent the molded disc substrate 1 from flapping, thereby making it possible for the molded disc substrate 1 to rotate at high speed in a horizontal state. As a result of this horizontal high speed rotation, because a uniform centrifugal force acts on the molded disc substrate 1 and a pulling force acts in an outward radial direction, warping is reduced until the resin material solidifies.

A brief description will now be given of the rotation speed of the molded disc substrate 1, which has a considerable effect on reducing warping. When the rotation speed of the molded disc substrate 1 is less than approximately 4,000 rpm, warping of the molded disc substrate 1 is further reduced as the rotation speed increases. However, if the rotation speed exceeds approximately 4,000 rpm, there is practically no further reduction in the warping of the molded disc substrate 1, and the warping remains constant. Accordingly, if the rotation speed of the molded disc substrate 1 is approximately 4,000 rpm or if the molded disc substrate 1 is rotated at a higher speed than this, it is possible to reduce warping essentially to a minimum. However, when the rotation speed of the molded disc substrate 1 is lower than 4,000 rpm, because warping of the molded disc substrate 1 is reduced, it is possible to obtain a sufficient effect as regards cooling and warping reduction even when the rotation speed is less than approximately 4,000 rpm. If, when the air flow is not in an outward radial direction along the lower surface of the molded disc substrate 1, the rotation speed of the molded disc substrate 1 is less than 3,000 rpm, the molded disc substrate 1 flaps up and down as it rotates, and does not rotate stably on a horizontal plane. Although warping of the molded disc substrate 1 is substantially reduced, the reduction effect is somewhat decreased. Moreover, if an airflow is blown onto the molded disc substrate 1 as it is rotating, the molded disc substrate 1 flaps up and down and does not rotate stably on a horizontal plane, however, if a gas such as air is made to flow in an outward radial direction along the lower surface of the molded disc substrate 1, as in the present invention, the warping reduction effect on the molded disc substrate 1 is further increased, and it is possible to obtain a flattened molded disc substrate 1 in which there is practically no warping.

If the rotation speed of the molded disc substrate 1 is raised to approximately 3,000 rpm or more, then, as was described above, there is essentially no up-down flapping motion in the molded disc substrate 1, and the molded disc substrate 1 rotates stably on a horizontal plane and warping is considerably reduced. The allowable limit of a tilt angle of a DVD formed by adhering together two disc substrates is 0.3 degrees, while there is no limit on the tilt angle for a single disc substrate. When, however, the rotation speed is approximately 3,000 rpm, the tilt angle of a molded disc substrate is smaller than 0.2 degrees, so that even if two such discs are adhered together, a DVD with a tilt angle less than the allowable limit of 0.3 degrees is obtained. If a molded disc substrate having reduced warping as a result of undergoing the above described process is used, then it is even possible to obtain a DVD that conforms satisfactorily with the specifications when the DVD is made by adhering a sheet that is thinner than a molded disc substrate to a molded disc substrate.

Figure 3:
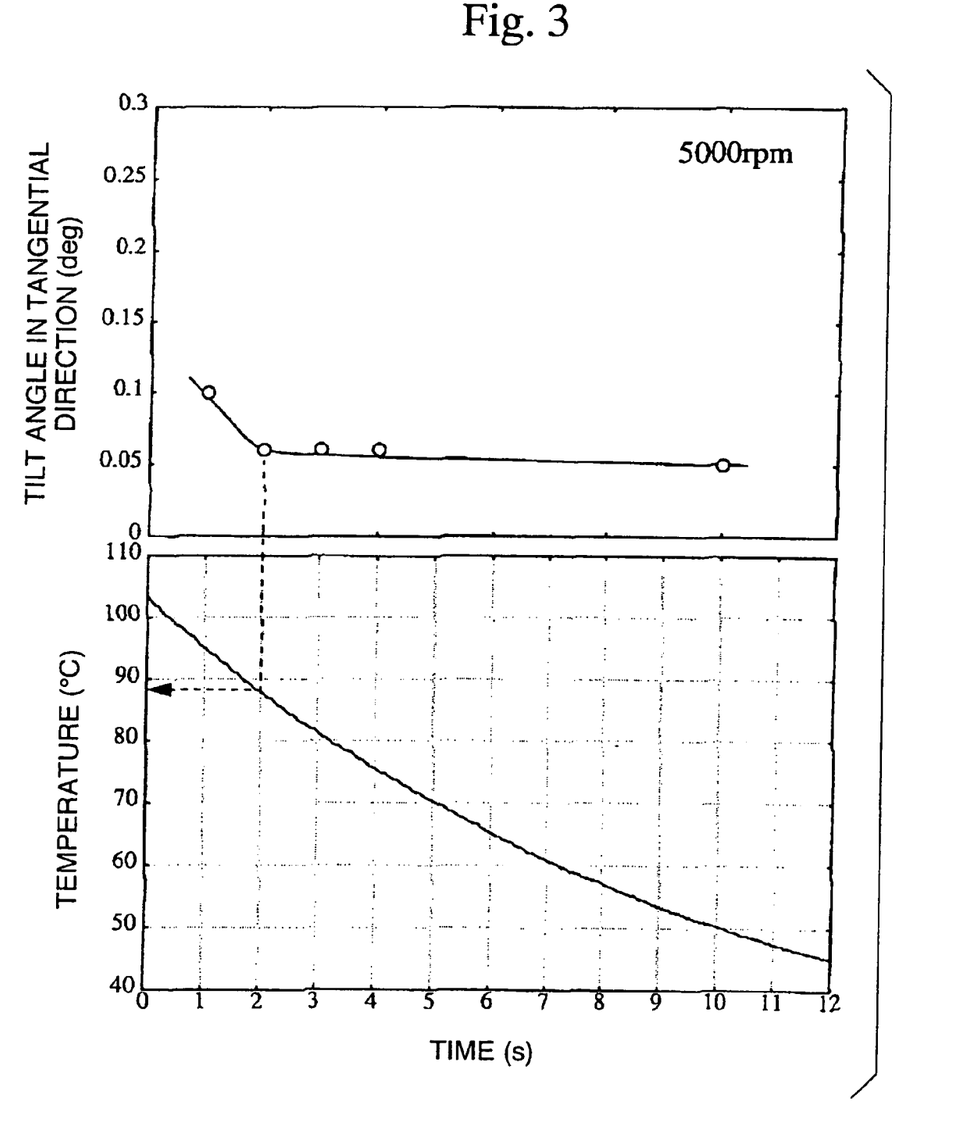
FIG. 3 is a characteristic view for describing an embodiment of the present invention.

Here, because the molded disc substrate 1 is forcibly cooled by its rotation and by the gas flowing over the lower surface of the molded disc substrate 1, the temperature of the molded disc substrate 1 is lowered far more rapidly than if the molded disc substrate 1 were simply left to cool naturally. As an example, as is shown in FIG. 3, in conditions of a rotation speed of 5,000 rpm and at room temperature, it takes approximately two seconds (for example, 1.5 to 3 seconds) for the resin material to cool to approximately 90° C. (the solidification temperature) at which temperature it begins to solidify or to harden (referred to below as "solidify"). If the temperature of the molded disc substrate 1 drops below the solidification temperature, then there is substantially no further reduction in the warping even at 5,000 rpm rotation speed. From this it can be understood that approximately 90° C. is the solidifying temperature of the resin material of the molded disc substrate 1 used in the present embodiment.

Figure 4:
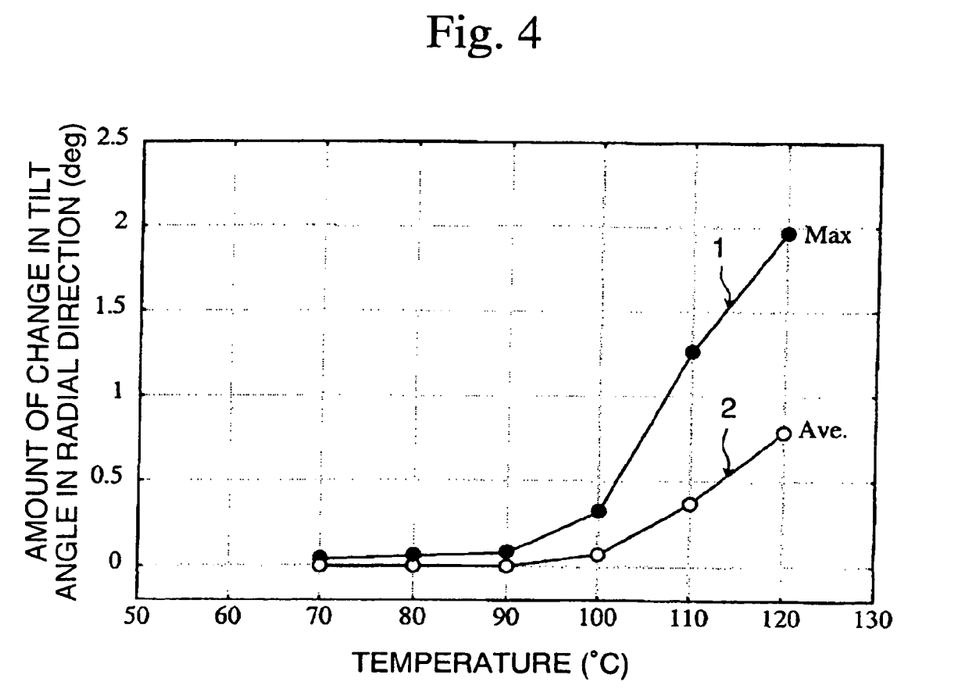
FIG. 4 is a characteristic view for describing an embodiment of the present invention.
Figure 5:
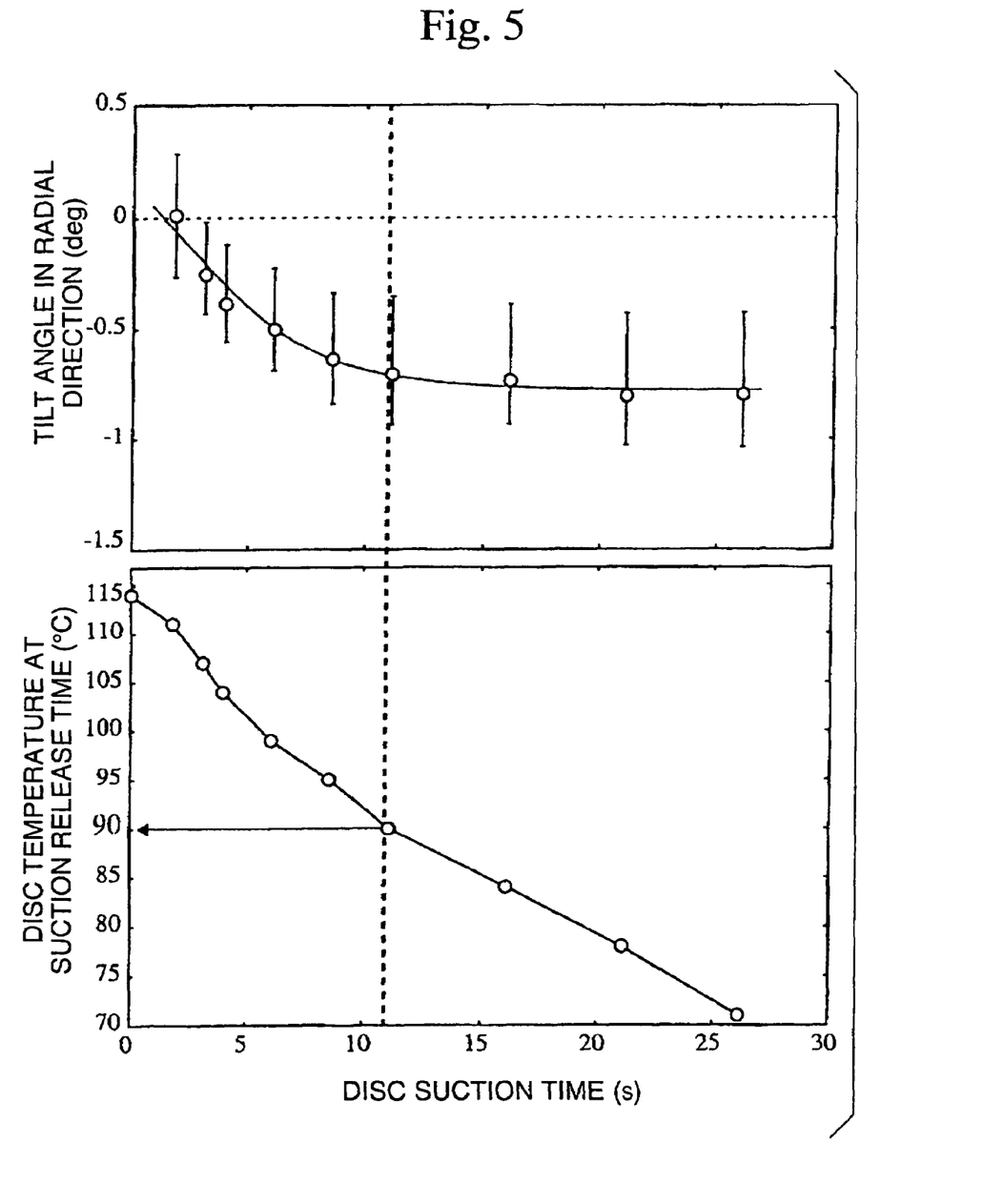
FIG. 5 is a characteristic view for describing an embodiment of the present invention.

FIG. 4 shows the relationship between the maximum temperature after the molded disc substrate 1 is heated and then left to cool naturally, and the amount of change in the tilt angle in the radial direction before this heating and after this heating. From this drawing as well it can be seen that if the temperature of the molded disc substrate 1 drops below approximately 90° C., then there is substantially no longer any change in the tilt angle. In FIG. 5, a curved line 1 shows the maximum amount of change in the tilt angle of several samples. When the temperature of the molded disc substrate 1 is between 100° C. and 90° C., the maximum amount of change in the tilt angle is decreased and there is substantially no change at all below 90° C. and the tilt angle is constant. Namely, it can be seen that there is almost no change even at the maximum amount of change in the tilt angle. Next, the curved line 2 shows the average amount of change in the tilt angle of several samples. When the temperature of the molded disc substrate 1 is between 100° C. and 90° C., there is very little amount of change in the tilt angle, and the tilt angle becomes constant if the temperature drops any lower to below 90° C. From this fact as well, it is understood that approximately 90° C. is the temperature at which the resin material of the molded disc substrate 1 of the present embodiment essentially solidifies, and that, once solidified, warping of the molded disc substrate 1 neither increases or decreases but remains constant.

Figure 6:
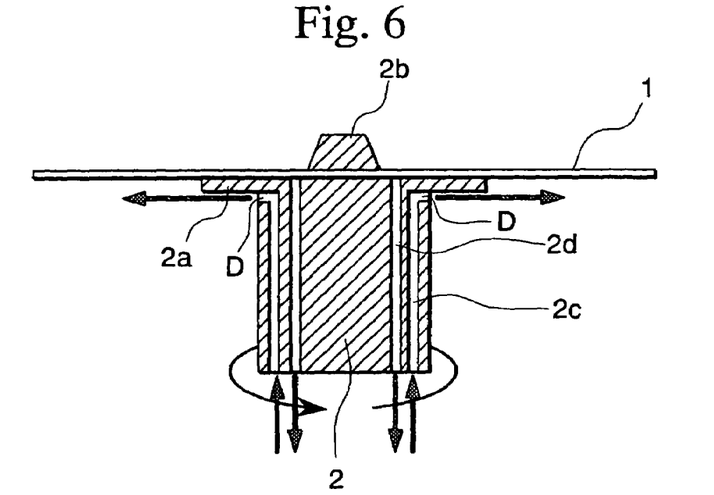
FIG. 6 is a characteristic view for describing another embodiment of the present invention.

Next, another embodiment will be described using FIG. 6. In this embodiment, the disc receiving base 2 has conventional first gas flow passages 2d and second gas flow passages 2c. The first gas flow passages 2d are formed on the inner side of the second gas flow passages 2c at a substantially constant spacing, for example, a 30° spacing, and one end of these is connected to a suction mechanism (not shown). The upper ends of the first gas flow passages 2d each extend to the top surface of the disc receiving base 2, and the lower ends are connected to a suction mechanism (not shown). When the suction mechanism (not shown) is operating, the molded disc substrate 1 is held by suction to the disc receiving base 2. In the same way as for the gas discharge nozzles that were described above, the second gas flow passages 2c are flow passages for supplying gas to be discharged, and one end thereof is connected to a compressed gas supply device (not shown), while the other end is open facing an outward radial direction directly below the flange 2a. In the present embodiment, two gas discharge apertures D are provided approximately 180° apart from each other, however, one or three or more apertures may be provided. When the compressed gas supply device (not shown) is operated, compressed gas is discharged at 0.01 MPa through 0.1 MPa from the two gas discharge apertures D, and this compressed gas flows in an outward radial direction from the bottom surface of the flange 2a along the bottom surface of the molded disc substrate 1. In an identical manner to the airflow discharged from the gas discharge nozzle in the above described embodiment, the compressed gas here cools the molded disc substrate 1 while preventing the molded disc substrate 1 from flapping as it rotates.

In the above described embodiment, it was confirmed that the cooling performance for the molded disc substrate 1 was considerably better compared with when the molded disc substrate 1 was cooled simply by rotation. As described above, approximately 90° C. is the solidification temperature of the resin material forming the molded disc substrate 1, and after solidifying there is no further reduction in the warping of the molded disc substrate 1 even if it is rotated at high speed. Accordingly, in the present invention, warping is reduced even further by raising the rotation speed as rapidly as possible to a predetermined rotation speed, preferably, 4,000 rpm or more, and while the resin material of the molded disc substrate 1 is still soft, rotating the molded disc substrate 1 at a rotation speed greater than the predetermined rotation speed for as long a time as possible so as to impart a considerable centrifugal force to the molded disc substrate 1. As is shown in FIG. 3, when the rotation speed is 5,000 rpm, the time required until the resin material of the molded disc substrate 1 cools to the approximately 90° C. (solidification temperature) is approximately two seconds. Therefore, in the case where the maximum rotation speed is 5,000 rpm, if the rotation speed cannot be raised to 5,000 rpm within the approximately two seconds, the warp reduction effect is reduced. For the rotation speed to reach 4,000 rpm or more from the start of rotation takes approximately two seconds. It is necessary to raise the rotation speed of the molded disc substrate 1 to the set rotation speed in less time than the approximately two seconds.

Note that, in the present embodiment, it is possible for the gas discharge to be stopped after the resin material of the molded disc substrate 1 has solidified, namely, after approximately two seconds have passed since the start of rotation. However, after the resin material of the molded disc substrate has solidified, the gas discharge remains useful for cooling, and it is possible to lower the temperature of the molded disc substrate 1 to room temperature in a short period of time. Therefore, preferably, the discharge continues until the rotation of the molded disc substrate 1 has stopped.

Although not shown in the drawings, it is also possible for two or more types of gas supply path to be provided. One type of gas supply path may be for supplying a gas such as air that has been heated to 90° C. or more by a heating device such as a heater, while the other type of gas supply path may be for supplying a gas such as air that has been cooled to room temperature or below. By switching between these two types of gas supply path using a selector valve (not shown), it is possible to firstly apply a heated airflow so as to slow the solidifying of the resin material of the molded disc substrate 1, and thereby lengthen the time that is applied to reducing warping in the molded disc substrate 1. As a result, while the molded disc substrate 1 is not flapping, it is possible to achieve an even further reduction in the warping of the molded disc substrate 1. Subsequently, at approximately the time when the resin material of the molded disc substrate 1 solidifies, it is possible to perform a cooling operation by discharging cooled gas at the same time as stopping the supply of heated airflow.

Figure 7:
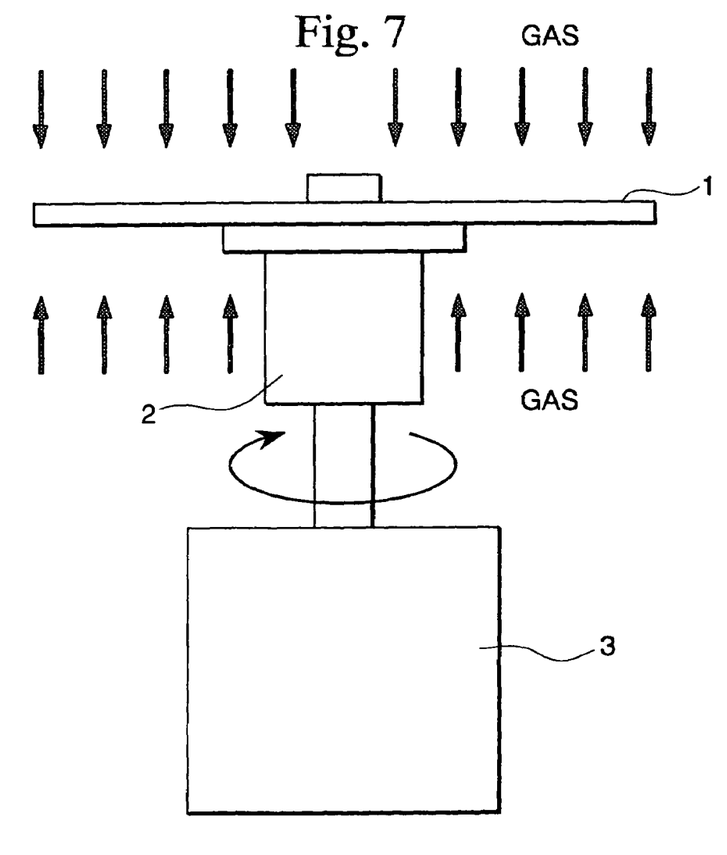
FIG. 7 is a view for describing another embodiment of the present invention.

Next, another embodiment of the present invention will be described. In this embodiment, as is shown by the arrows in FIG. 7, after the resin material of the molded disc substrate 1 has solidified, cooling is speeded up further by blowing a gas directly onto the solidified disc substrate. As was seen in the previous embodiment, because the solidifying of the molded disc substrate 1 begins approximately two seconds after rotation starts, the gas is discharged at a set time after approximately two seconds have elapsed. Specifically, in this operation it is sufficient if a drive command signal to the rotation drive device 3 is received by a timer (not shown) and a release signal is then generated a set time thereafter. Subsequently, this release signal opens a switching valve (not shown) that opens and closes a gas supply path (not shown). By opening this switching valve, a gas is discharged a set time after the rotation of the molded disc substrate 1. Because the molded disc substrate 1 is already solidified, the operation of the gas in the present embodiment is only in order to hasten the cooling thereof. Therefore, as is shown in FIG. 7, it is preferable that gas is blown onto both sides of the molded disc substrate 1 at substantially the same rate, however, it is also to be understood that the gas may be blown from one side only. No gas blowing device is shown in the drawings, however, the gas blowing device may be formed by normal blower device, or by arranging a plurality of gas discharge nozzles, such as those described in the above embodiments, either in a single row or zigzagged along the diametrical direction of the molded disc substrate 1. Note that if the present embodiment is combined with the above embodiments, then the cooling and warping reduction of the molded disc substrate 1 can be favorably achieved.

In the above embodiments, the molded disc substrate 1 is rotated at high speed even after it has solidified, however, it is also possible to decrease the rotation speed, or to stop the rotation after the molded disc substrate 1 has solidified. However, as is described above, because the rotation is useful in hastening the cooling, it is preferable that the rotation be continued up until immediately before the molded disc substrate 1 is transferred from the disc receiving base to another location.

As has been described above, in the present invention, because it is possible to manufacture in a short time a disc substrate having a small amount of warping without imparting any adverse affect on the molded disc substrate, it is possible to provide a high quality optical disc with little warping at low cost.

What is claimed is:

1. A disc substrate processing apparatus that reduces warping in a molded disc substrate obtained by injection molding by rotating the molded disc substrate, comprising:
    a disc receiving base having a flange extending in an outer radial direction for receiving the molded disc substrate;
    a rotation drive device which rotates the molded disc substrate by rotating the disc receiving base; and
    a gas discharging device which discharges gas while the disc receiving base is rotating so that the gas flows in an outward radial direction of the disc receiving base along at least one surface of the rotating molded disc substrate substrate, wherein:
    the gas discharge device is a gas discharge nozzle that is positioned toward a receding side of the disc receiving base during rotating so as to supply the gas from a diagonally lower position to the receding side of the disc receiving base.

2. A disc substrate processing apparatus according to claim 1, further comprising a temperature control device to lower or raise the temperature of the gas.

3. A disc substrate processing apparatus that reduces warping in a molded disc substrate obtained by injection molding by rotating the molded disc substrate, comprising:
    a disc receiving base having a flange extending in an outer radial direction for receiving the molded disc substrate;
    a rotation drive device which rotates the molded disc substrate by rotating the disc receiving base; and
    a gas discharging device which discharges gas while the disc receiving base is rotating so that the gas flows along at least one surface of the rotating molded disc substrate, wherein:
    the gas discharge device is a gas discharge nozzle that is positioned toward a receding side of the disc receiving base during rotating so as to supply the gas from a diagonally lower position to the receding side of the disc receiving base; and
    the rotation drive device rotates the molded disc substrate at a rotation speed of 3,000 rpm or more while the molded disc substrate is higher than 90° C.

4. A disc substrate processing apparatus according to claim 3, wherein the gas discharging device discharges the gas while the rotating molded disc substrate is higher than 90° C.

* * * * *